March 18, 1930.  P. C. GROVER  1,750,840

WHEEL PULLER

Filed March 11, 1929

Inventor
Percy C. Grover
By Johnston & Jennings
Attorneys

Patented Mar. 18, 1930

1,750,840

UNITED STATES PATENT OFFICE

PERCY C. GROVER, OF BIRMINGHAM, ALABAMA

WHEEL PULLER

Application filed March 11, 1929. Serial No. 346,206.

My invention relates to wheel pullers, more particularly to a device for pulling the rear wheels of an automobile from their axles, and has for its object the provision of a device of the character designated which shall be simple of construction and operation and which shall be more durable in use than any heretofore known to me.

In my prior United States Patent, No. 1,590,973, issued June 29th, 1926, there is shown, described and claimed, an automobile wheel puller embodying a compressible ring adapted to screw onto the wheel hub and having an externally tapered portion, and a sleeve having an internal taper fitting over the ring. A bushing is adapted to screw into one end of the sleeve and a wedge and plunger is associated with the device whereby a force is applied to the end of the wheel axle which exerts a compressive force on the ring to cause it to tightly grip the wheel hub and prevent stripping of the threads on the hub when pulling the wheel.

My present invention is particularly directed toward improving the device of my prior patent. While my prior invention has proved eminently satisfactory in use for pulling automobile wheels, I have found that the outer sleeve member, when continuously subjected to the severe strains occasioned by a driven wedge, soon has its threads so damaged as to require its replacement. I have furthermore found that the plunger employed with my prior device, especially where the wheel being pulled is tightly engaged with its axle, sometimes spreads the ends of the wheel axle and thereby damages the threads thereon.

In accordance with my present invention, I provide a sleeve member as described in my prior patent which is provided at one end with an internally tapered portion to cooperate with a compressible ring adapted to screw onto a wheel hub. The other end of the sleeve member is internally threaded to cooperate with an expansible ring which is adapted to screw into the sleeve and which is internally tapered. Fitting within the expansible ring is an externally tapered guide which is positioned, when force is applied thereto, to expand the ring, whereby the threads of the latter more tightly engage the threaded portion of the sleeve. Cooperating with the plunger guide is a wedge member adapted to bear against the ends of the plunger, which latter cooperates with the end of the wheel axle. The plunger is made hollow and is preferably internally threaded to screw over the end of the wheel axle.

Apparatus embodying features of my invention is illustrated in the accompanying drawings, forming a part of this application, wherein Fig. 1 is a longitudinal section of my improved wheel puller and showing it in engagement with the hub and axle of an automobile wheel;

Figure 3:
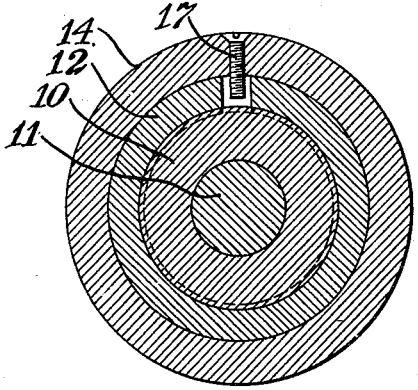
Figs. 3, 4 and 5 are sectional views taken along the lines III—III, IV—IV and V—V, respectively, of Fig. 1.

Referring to the drawings for a better understanding of my invention, I show an automobile wheel hub 10 fitting over an axle 11. Screwed onto the end of the hub 10 is a split compressible ring 12 which is externally tapered as shown at 13. Fitting over the ring 12 is a sleeve 14 which is internally tapered to fit over the ring 12, as shown at 16. A screw 17 passes through the sleeve and terminates between the ends of the split ring 12 as shown in Fig. 3, to prevent relative rotation between the sleeve and ring 12.

Figure 4:
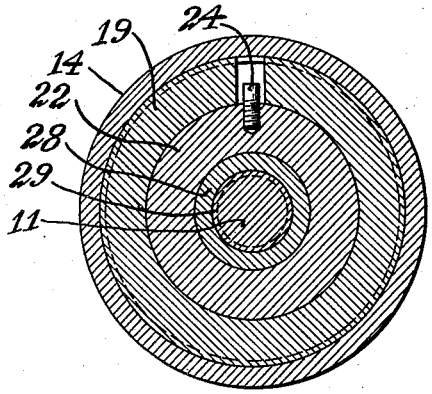
Figure 5:
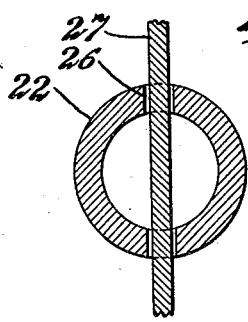

The other end of the sleeve 14 is internally threaded at 18. Screwed into the internally threaded end of the sleeve is an expansible split ring 19 which is bored with an internal taper as shown at 21. Fitting within the expansible ring 19 is a plunger guide 22 having its inner end tapered at 23 to fit into the tapered portion of the expansible ring 19. A set screw 24 is screwed into the tapered portion of the plunger guide and has its upper end positioned between the ends of the split ring 19 as shown in Fig. 4. This set screw 24 serves to hold the parts in their proper assembled relation.

The outer end of the plunger guide 22 is provided with a transverse slot 26 to receive a wedge member 27 which protrudes from the plunger guide in position to be struck by a hammer. Fitting within the plunger guide 22, in position to cooperate with the wedge 27, is a plunger 28 which is adapted also to cooperate with the end of the axle 11. The plunger 28 is bored and internally threaded as shown at 29 and is of such size as to screw on over the end of the axle 11.

Inasmuch as the sizes of the wheel hubs 10 and of the threaded portions of the axle 11 differ in different makes of automobiles, I provide rings 12 and plungers 28 of different sizes to cooperate with the different sizes of wheel hubs and axles, these parts being interchangeable with the other members comprising my improved device.

Figure 1:
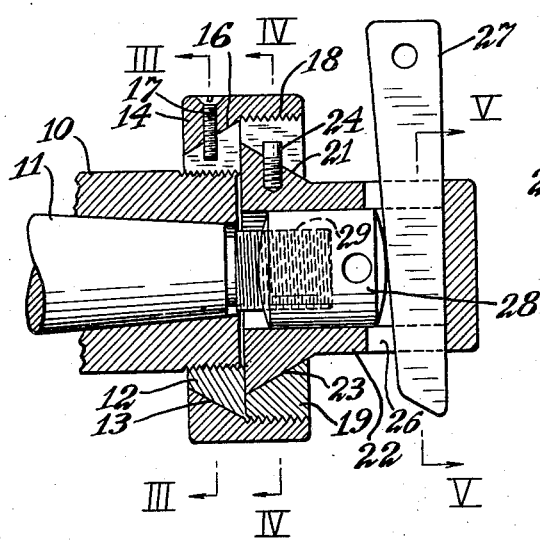
Figure 2:
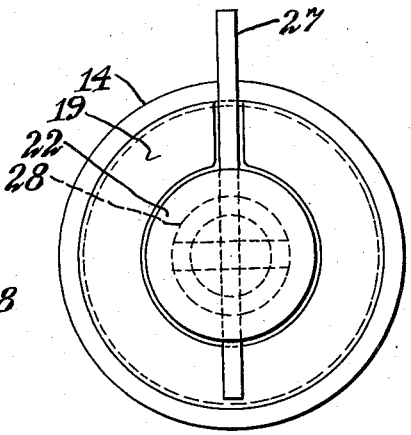
Fig. 2 is an end view of the same.

From the foregoing description the operation of my improved wheel puller will be readily understood. With the parts assembled as shown in Fig. 1, the wedge 27 is struck with a hammer or other suitable tool, thereby exerting a force against the plunger 28 and the plunger guide 22. The force transmitted through the plunger guide 22 expands the ring 19 to cause it to grip the threads 18 of the sleeve 14 more tightly and the sleeve 14, transmitting the force to the compressible ring 12 through the cooperating tapered portions, causes the compressible ring 12 to engage firmly the threaded end of the wheel hub 10. The longitudinal force exerted on the plunger guide 22, transmitted through the plunger 28 to the wheel axle 11 causes the wheel to become disengaged from the axle. At the same time, the plunger 28, fitting over the threaded end of the axle, obviates all danger of spreading the end of the axle and damaging its threads.

While I have shown my invention in but one form, it will be obvious to those skilled in the art that it is not so limited but is susceptible of various changes and modifications without departing from the spirit thereof and I desire therefore that only such limitations shall be placed thereupon as are imposed by the prior art, or as are specifically set forth in the appended claims.

What I claim is:

1. In a wheel puller of the character described, a sleeve internally threaded at one end and having an internally tapered bore at the other end, a compressible member having threads to cooperate with the threads of a wheel hub and being externally tapered to cooperate with the internal taper of the sleeve, a plunger guide having at one end an external taper, an expansible externally threaded bushing adapted to screw into the threaded end of the sleeve and having an internal taper adapted to fit over the tapered end of the plunger guide and be expanded by force applied to the plunger guide, a plunger in the plunger guide and adapted to cooperate with a wheel axle, and a wedge member positioned to cooperate with the plunger and the plunger guide.

2. In a wheel puller of the character described, a sleeve internally threaded at one end and having an internally tapered bore at the other end, a compressible member having threads to cooperate with the threads of a wheel hub and being externally tapered to cooperate with the internal taper of the sleeve, a plunger guide having at one end an external taper, an expansible externally threaded bushing adapted to screw into the threaded end of the sleeve and having an internal taper adapted to fit over the tapered end of the plunger guide and be expanded by force applied to the plunger guide, a plunger in the plunger guide to cooperate with a wheel axle, and a wedge member positioned to cooperate with the plunger and the plunger guide, the plunger being internally bored at its end bearing against the axle.

3. In a wheel puller of the character described, a sleeve internally threaded at one end and having an internally tapered bore at the other end, a compressible member having threads to cooperate with the threads of a wheel hub and being externally tapered to cooperate with the internal taper of the sleeve, a plunger guide having at one end an external taper, an expansible externally threaded bushing adapted to screw into the threaded end of the sleeve and having an internal taper adapted to fit over the tapered end of the plunger guide and be expanded by force applied to the plunger guide, a plunger in the plunger guide and adapted to cooperate with a wheel axle, and a wedge member positioned to cooperate with the plunger and the plunger guide, the plunger being internally bored and threaded to fit over the end of the wheel axle.

In testimony whereof I affix my signature.

PERCY C. GROVER.